United States Patent
Kunzli et al.

(10) Patent No.: US 11,454,544 B2
(45) Date of Patent: Sep. 27, 2022

(54) MOTION SENSOR DEVICE, METHOD FOR OPERATING A MOTION SENSOR DEVICE AND LIGHTING SYSTEM

(71) Applicants: TRIDONIC GMBH & CO KG, Dornbirn (AT); ZUMTOBEL LIGHTING GMBH, Dornbirn (AT)

(72) Inventors: Markus Kunzli, Glarus (CH); Roger Kistler, Ennenda (CH); Vana Jelicic, Tettnang (DE)

(73) Assignees: Tridonic GmbH & Co KG, Dornbirn (AT); Zumtobel Lighting GmbH, Dornbirn (AT)

( * ) Notice: Subject to any disclaimer, the term of this patent is extended or adjusted under 35 U.S.C. 154(b) by 267 days.

(21) Appl. No.: 16/644,620

(22) PCT Filed: Aug. 24, 2018

(86) PCT No.: PCT/EP2018/072858
§ 371 (c)(1),
(2) Date: Mar. 5, 2020

(87) PCT Pub. No.: WO2019/048257
PCT Pub. Date: Mar. 14, 2019

(65) Prior Publication Data
US 2021/0080325 A1    Mar. 18, 2021

(30) Foreign Application Priority Data
Sep. 6, 2017   (DE) .................. 10 2017 215 686.4

(51) Int. Cl.
*H05B 47/10*    (2020.01)
*G01J 5/00*    (2022.01)
*H05B 47/13*    (2020.01)

(52) U.S. Cl.
CPC ............ *G01J 5/0025* (2013.01); *H05B 47/13* (2020.01); *G01J 2005/0077* (2013.01)

(58) Field of Classification Search
CPC ...... H05B 47/13; H05B 47/115; G08B 13/19; G08B 13/191; G08B 29/183
See application file for complete search history.

(56) References Cited

U.S. PATENT DOCUMENTS

| | | | |
|---|---|---|---|
| 6,215,399 B1 * | 4/2001 | Shpater | G08B 13/191 250/340 |
| 9,296,707 B2 | 3/2016 | Chang et al. | |

(Continued)

FOREIGN PATENT DOCUMENTS

| | | |
|---|---|---|
| DE | 4218151 | 12/1992 |
| DE | 19625235 | 1/1998 |

(Continued)

OTHER PUBLICATIONS

German search report dated Jul. 30, 2018 in priority German Patent Application 10 2017 215 686.4.

(Continued)

*Primary Examiner* — Tung X Le
(74) *Attorney, Agent, or Firm* — Andrus Intellectual Property Law, LLP (57) ABSTRACT

The invention relates to a motion sensor device (10), comprising: a PIR sensor (11) having a plurality of sensor elements (12) arranged adjacent to each other, the active sensor surfaces of which form a detection region (13) of the PIR sensor (11); an optical unit (15), which is designed to image a detection region (16) of the PIR sensor (11), which comprises detection zones (17), on the detection region (13) of the PIR sensor (11); wherein the detection zones (17) in the detection region (16) of the PIR sensor (11) have a spatially periodic arrangement having direction-dependent periodicity. The invention also relates to a lighting system (Continued)

(20) having the motion sensor device and a method (30) for operating the motion sensor device.

8 Claims, 3 Drawing Sheets

(56) References Cited

U.S. PATENT DOCUMENTS

| | | | | |
|---|---|---|---|---|
| 2005/0236572 A1* | 10/2005 | Micko | ................... | G08B 13/191 |
| | | | | 250/342 |
| 2009/0302220 A1* | 12/2009 | Micko | ................... | G08B 13/191 |
| | | | | 250/338.3 |
| 2015/0382432 A1 | 12/2015 | Eskonen et al. | | |
| 2017/0205289 A1 | 7/2017 | Purohit et al. | | |
| 2018/0335342 A1* | 11/2018 | Micko | ....................... | G01J 1/44 |
| 2019/0012607 A1* | 1/2019 | Holliday | ............... | G01J 5/0025 |
| 2019/0116645 A1* | 4/2019 | Tiberi | ................... | H05B 47/115 |

FOREIGN PATENT DOCUMENTS

| | | |
|---|---|---|
| DE | 102006057973 | 6/2008 |
| EP | 0633554 | 1/1995 |
| EP | 0867847 | 9/1998 |
| EP | 31966614 | 7/2017 |
| WO | 2013138307 | 9/2013 |
| WO | 2017136485 | 8/2017 |

OTHER PUBLICATIONS

PCT search report dated Nov. 8, 2018 in parent PCT Application PCT/EP2018/072858.

Austria search report dated Nov. 26, 2018 in co-pending Austria Patent Application GM 267/2017.

* cited by examiner

MOTION SENSOR DEVICE, METHOD FOR OPERATING A MOTION SENSOR DEVICE AND LIGHTING SYSTEM

CROSS REFERENCE TO RELATED APPLICATIONS

The present application is the U.S. national stage application of international application PCT/EP2018/072858 filed Aug. 24, 2018, which international application was published on Mar. 14, 2019 as International Publication WO 2019/048257 A1. The international application claims priority to German Patent Application 10 2017 215 686.4 filed Sep. 6, 2017.

FIELD OF THE INVENTION

The present invention relates to a motion sensor device, a method for operating same, and a lighting system having the motion sensor device.

BACKGROUND OF THE INVENTION

PIR sensors (pyroelectric/passive infrared sensors) serve for detecting temperature changes based on pyroelectricity, a property of some piezoelectric crystals of converting a temperature change into electrical polarization or charge separation.

Pyroelectric crystals react to temperature changes, which given a suitable absorption coating of the crystal can result from an incident radiation of a desired wavelength, in particular infrared radiation.

PIR sensors for motion detectors usually have a plurality (two or four) of adjacent sensor elements which are connected in opposite polarity to one another. Exposure of adjacent sensor elements consequently causes positive or negative voltage pulses. If exposed simultaneously, they cancel each other out; given sequential exposure, voltage edges are formed that can be detected well.

A detection region of motion detectors can be spatially expanded into a plurality of detection zones via a lens arrangement with a plurality of lenses, upstream of the PIR sensor. Each lens of the lens arrangement deflects the thermal radiation from one detection zone onto at least one of the plurality of sensor elements.

The formation of voltage edges that can be detected well is supported in that detection zones are spatially separated in relation to each other in such a way that an object which is warmer than the background is optimally only ever detected in one detection zone, or by the sensor element associated therewith, when the object passes through the detection region.

The plurality of adjacent sensor elements of known PIR sensors enable a detection that a movement is present in the detection region, but not in which direction this movement takes place.

SUMMARY OF THE INVENTION

There is therefore a need for motion sensor devices, methods for operating the same, and lighting systems having the motion sensor devices, which enable a detection of the direction of a detected motion.

This object is achieved according to the invention by a motion sensor device described herein.

A motion sensor device in accordance with a first aspect comprises: a PIR sensor having a plurality of sensor elements arranged adjacent to each other, the active sensor surfaces of which form a detection region of the PIR sensor; and an optical unit which is configured to image a detection region of the motion sensor device, said detection region comprising detection zones, on the detection area of the PIR sensor. The detection zones in the detection region of the motion sensor device have a spatially periodic arrangement with direction-dependent periodicity.

Such motion sensor devices advantageously enable recognition of a direction of a detected movement, which is based on an evaluation of the direction-dependent periodicity of the spatially periodic arrangement of the detection zones in the detection region of the motion sensor device. Furthermore, conventional PIR sensors can be used in such motion sensor devices.

In the sense of this application, "adjacent" is understood to mean a laterally opposite arrangement with a spatial separation, as is provided in particular between sensor elements of conventional PIR sensors.

An "active sensor surface" in the sense of this application is understood to mean that such a surface is permeable to radiation which contributes to a measurement signal of the PIR sensor.

In the sense of this application, an "optical unit" is understood to mean a lens arrangement having a plurality of lenses, or a mirror arrangement having a plurality of mirrors, facing toward the detection region of the motion sensor device. Such an optical unit can be produced from thermoplastic, for example.

A "spatially periodic arrangement" in the sense of this application is understood to mean a repeated, in particular duplicate or multiple, arrangement in at least one spatial direction.

"Direction-dependent periodicity" in the sense of this application is understood to mean a spatially periodic arrangement in two different spatial directions with repetition at differently frequent intervals with respect to the different spatial directions.

According to one exemplary embodiment, the motion sensor device further comprises a signal processing unit configured to determine the direction-dependent periodicity of the detection zones in the detection region of the motion sensor device.

Such a signal processing unit advantageously makes it possible to recognize a direction of a detected movement and/or a stop location of objects moving in the detection region of the motion sensor device.

A signal processing unit in the sense of this application is understood to mean a unit which is configured to receive, analyze, and convert input signals into output signals having an information content of interest. In particular, the signal processing unit is configured to receive, analyze, and convert measurement signals of the PIR sensor into output signals which indicate one or more movements, movement directions, and/or one or more stop locations of objects moving in the detection region of the motion sensor device.

According to one exemplary embodiment, the signal processing unit is further configured to form differential signals from output signals of the sensor elements between pairs of sensor elements of the PIR sensor that are arranged adjacent to one another, and/or to determine frequency components in the differential signals or the output signals.

Advantageously, such a signal processing unit enables a detection of frequency components, for example by means of spectral analysis, in those differential or output signals which conventional PIR sensors supply.

According to one exemplary embodiment, the detection zones have a spatially periodic arrangement with direction-dependent periodicity in accordance with first and second directions which are orthogonal to one another in the detection region of the motion sensor device.

Such a spatially periodic arrangement with direction-dependent periodicity in accordance with first and second directions which are orthogonal to one another advantageously spans a Cartesian coordinate system in a walking or moving surface that is detected by the detection region of the motion sensor device. All directions of movement in a plane of the walking or moving surface can be described on the basis of this coordinate system.

According to one exemplary embodiment, the optical unit is configured to image groups of the detection zones via a respective imaging in the detection area of the PIR sensor.

Advantageously, a group-by-group imaging of the detection zones into the detection area of the PIR sensor limits a number of the lenses which the optical unit must comprise, since one lens is required per image or group.

According to one exemplary embodiment, a number of the detection zones of a respective one of the groups of detection zones corresponds to a number of the sensor elements of the PIR sensor.

According to one exemplary embodiment, an arrangement of the detection zones corresponds to the respective group of the detection zones of the arrangement of the sensor elements of the PIR sensor arranged that are adjacent to one another.

Advantageously, respective imaging of such groups of detection zones is easily converted into corresponding lenses for the optical unit.

According to one exemplary embodiment, the optical unit is configured to superimpose a plurality of the groups of the detection zones in the detection area of the PIR sensor.

Such an optical unit with a plurality of lenses, wherein each one of the plurality of lenses produces an imaging of one of the plurality of groups of the detection zones, advantageously enables a detection of a number of detection zones which is an integer multiple of the number of the sensor elements of the PIR sensor.

According to one exemplary embodiment, the optical unit is configured to scale the respective group of the detection zones for imaging in the detection area of the PIR sensor in a first dimension, which first dimension extends in the first direction in the detection region of the motion sensor device.

According to one exemplary embodiment, the optical unit is configured to scale the respective group of the detection zones for imaging in the detection area of the PIR sensor in a second dimension orthogonal to the first dimension, which second dimension extends in the second direction in the detection region of the motion sensor device.

Such an optical unit advantageously enables a variation of a spatial periodicity—or, in other words, of a spatial frequency—of the spatially periodic arrangement of the detection zones in the detection region of the motion sensor device in the first direction, and/or in the second direction orthogonal thereto, in the walking or moving surface detected by the detection region of the motion sensor device.

A "spatial frequency" in the sense of this application is understood to mean a number of periods per unit of length in one spatial direction.

According to one exemplary embodiment, the optical unit is configured to completely image all of the detection zones of the detection region of the PIR sensor into the detection area of said PIR sensor.

Such an optical unit advantageously maximizes a sensitivity of the motion sensor device with respect to objects and movements to be detected, since a detectable radiation emitted in the detection zones is imaged to the greatest possible degree onto the sensor elements of the PIR sensor.

According to one exemplary embodiment, the PIR sensor comprises two or four of the sensor elements arranged adjacent to each other.

Conventional PIR sensors with a corresponding number and arrangement of sensor elements can therefore advantageously be used in the motion sensor device.

A lighting system in accordance with a second aspect comprises a motion sensor device in accordance with exemplary embodiments.

Such a lighting system advantageously enables a detection of movements, movement directions, and/or stop locations of objects which move in detection regions of motion sensor devices, for lighting applications, and moreover for an Internet of Things (IoT) which indiscernibly assists a person in his or her activities, for example.

A method in accordance with a third aspect for operating a motion sensor device comprising a PIR sensor having a plurality of sensor elements arranged adjacent to one another, whose active sensor surfaces form a detection area of the PIR sensor, comprises: imaging of a detection region, which comprises detection zones, onto the detection area of said PIR sensor, wherein the detection zones in the detection region of the motion sensor device have a spatially periodic arrangement with direction-dependent periodicity; and a determination of the direction-dependent periodicity of the detection zones in the detection region of the motion sensor device.

According to one exemplary embodiment, the method with the motion sensor device is performed in accordance with exemplary embodiments.

Consequently, the features mentioned in connection with the motion sensor device can be used analogously in the method. Furthermore, analogous effects and advantages result for the method.

BRIEF DESCRIPTION OF THE FIGURES

The invention will be explained briefly below using preferred embodiments and with reference to the drawings, wherein identical reference signs indicate identical or similar elements.

DETAILED DESCRIPTION OF EXEMPLARY EMBODIMENTS

The invention will be explained in more detail below using preferred embodiments and with reference to the drawings.

A description of exemplary embodiments in specific fields of application does not imply a limitation to such fields of application.

Elements of schematic representations are not necessarily reproduced to scale; rather, they are reproduced such that their function and purpose will be understood by the person skilled in the art.

Unless expressly indicated otherwise, the features of the various embodiments can be combined with one another.

Figure 1:
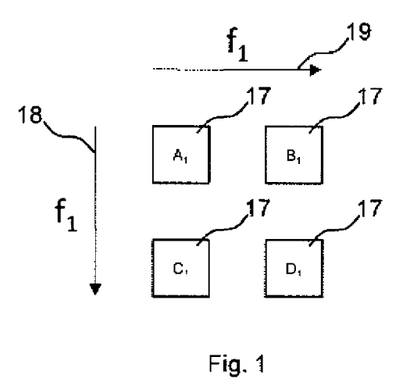
FIG. 1-3 schematically show plan views of groups of detection zones of a motion sensor device in accordance with exemplary embodiments.
Figure 2:
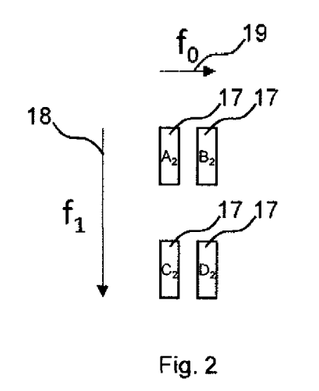
Figure 3:
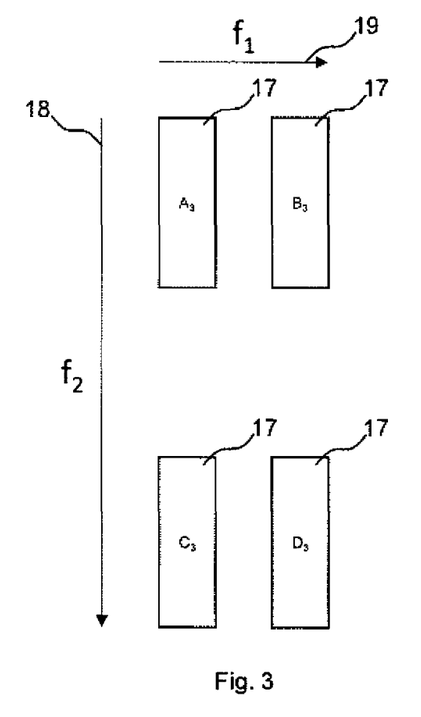

FIG. 1-3 schematically show plan views of groups of detection zones 17 of a motion sensor device 10 in accordance with exemplary embodiments.

In these Figures, a number and an arrangement of the detection zones 17 of a respective one of the groups of the detection zones 17 corresponds to a number and an arrangement of the sensor elements 12 of the PIR sensor 11.

The PIR sensor 11 of the motion sensor device 10—not shown—comprises four sensor elements 12 arranged adjacently in relation to one another, which in the PIR sensor 11 are arranged in relation to each other corresponding to the detection zones 17 of the group of detection zones 17 shown in FIG. 1.

For imaging in the detection area 13 of the PIR sensor 11, the optical unit 15 of the motion sensor device 10 is configured to scale the respective group of the detection zones 17 as shown in FIG. 1-3 in a first dimension, and/or in a second dimension orthogonal to the first dimension, which extend in the first direction 18 and/or in the second direction 19 in the detection region 16 of the motion sensor device 10.

Accordingly, different periodicities or spatial frequencies in the first and second directions 18, 19 result, given a spatially periodic arrangement of the respective group of the detection zones 17 shown in FIG. 1-3.

FIG. 1 shows no scaling, whereas FIG. 2 shows a compression in the second dimension or second direction 19, and FIG. 3 shows an extension in the first dimension or first direction 18. Therefore, in the first and second directions 18, 19, spatial frequencies with frequency components $f_1$ and $f_1$ result in FIG. 1, spatial frequencies with frequency components $f_1$ and $f_0$ result in FIG. 2, and spatial frequencies with frequency components $f_2$ and $f_1$ result in FIG. 3.

Letters A-D and numerical indices are associated with the groups of detection zones 17 shown in FIG. 1-3. This serves for better understanding of the superposition of these groups of detection zones 17 as shown in the following FIG. 4. The letters designate a respective sensor element A-D of the PIR sensor 11 at which an imaging of the detection zone 17 so identified takes place via the optical unit 15, whereas the numerical indices designate a respective group of detection zones 17. For example, the detection zones 17 designated in FIG. 2 as $A_2$-$D_2$ are imaged together as group 2 on the PIR sensor 11, wherein the detection zones 17 designated as $A_2$-$D_2$ meet at the sensor elements A-D of the PIR sensor 11.

Figure 4:
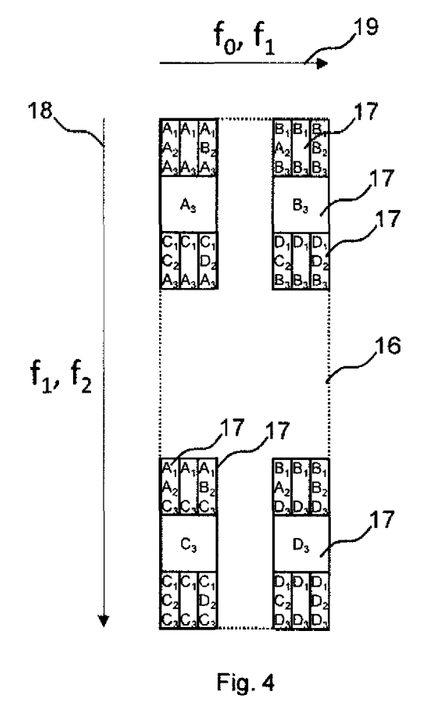
FIG. 4 schematically shows a plan view of a plurality of groups of detection zones superimposed in a detection region of a motion sensor device in accordance with exemplary embodiments.

FIG. 4 schematically shows a plan view of a plurality of groups of detection zones 17 that are superimposed in a detection region 16 of a motion sensor device 10 in accordance with exemplary embodiments.

For reasons of clarity, FIG. 4 shows only a small selection of detection zones 17 with the associated reference signs.

In FIG. 4, the groups of detection zones 17 introduced in FIG. 1-3 have been superimposed in the detection region 16 such that the superimposed detection zones 17 have a spatially periodic arrangement with direction-dependent periodicity according to the first and second directions 18, 19, which are orthogonal to one another, in the detection region 16 of the motion sensor device 10.

Specifically, the detection region 16 shown in FIG. 4 comprises firstly the group 3 of detection zones 17 from FIG. 3, and secondly the group 1 of detection zones 17 from FIG. 1, and namely in a first instance superimposed on the upper two detection zones $A_3$, $B_3$, and in a second instance superimposed on the lower two detection zones $C_3$, $D_3$. The detection region 16 from FIG. 4 further comprises in four instances the group 2 of detection zones 17 from FIG. 2, namely each superimposed once on the detection zones $A_3$, $B_3$, $C_3$, and $D_3$.

With continued reference to FIG. 4, the detection zones 17 in the detection region 16 of the motion sensor device 10 have a spatially periodic arrangement with direction-dependent periodicity composed of the direction-dependent periodicities of the superimposed groups of detection zones 17.

Upon closer analysis, spatial frequencies $f_1$ and $f_2$ in the first direction 18 and spatial frequencies $f_0$ and $f_1$ in the second direction 19 result in the detection region 16 of the motion sensor device 10 spanned in the plane of these two directions 18, 19.

Figure 5:
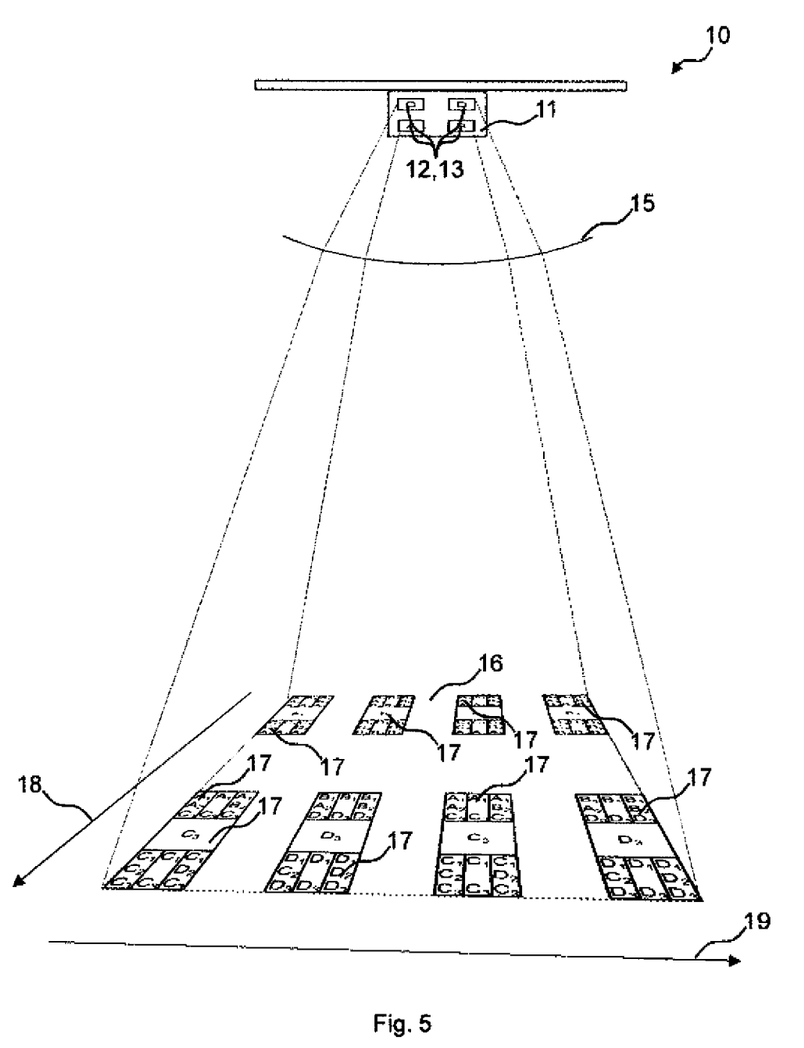
FIG. 5 schematically shows a perspective view of a motion sensor device in accordance with exemplary embodiments.

FIG. 5 schematically shows a perspective view of a motion sensor device 10 according to exemplary embodiments.

For reasons of clarity, only a small selection of detection zones 17 has been identified by the associated reference signs in FIG. 5.

The motion sensor device 10 shown in FIG. 5 comprises: a PIR sensor 11, attached by way of example beneath a ceiling, with a plurality of sensor elements 12 which are arranged adjacent to one another, which for purposes of illustration are designated with the letters A-D and whose active sensor surfaces form a detection area 13 of the PIR sensor 11; and an optical unit 15, which is configured to image a detection region 16 of the motion sensor device 10, said detection region 16 comprising detection zones 17, onto the detection area 13 of the PIR sensor 11.

The detection zones 17 of the detection region 16 of the motion sensor device 10 have a spatially periodic arrangement with direction-dependent periodicity, which in this exemplary embodiment corresponds to the superposition of a plurality of groups of detection zones 17 as shown in FIG. 4.

As FIG. 5 further shows, the detection zones 17 in particular have a spatially periodic arrangement with direction-dependent periodicity in accordance with first and second directions 18, 19, which are orthogonal to one another, in the detection region 16 of the motion sensor device 10.

The optical unit 15 of the motion sensor device 10 is configured to image groups of the detection zones 17 via a respective imaging into the detection area 13 of the PIR sensor 11, and to thereby superimpose the plurality of groups of the detection zones 17 in the detection area 13 of the PIR sensor 11. In particular, each of the groups i of detection zones 17 as shown in FIG. 1-3, which are superimposed by way of example in FIG. 4, is imaged onto the detection area 13 of the PIR sensor by means of a respective lens of the optical unit 15. The detection zones 17 of a respective group of detection zones 17, respectively designated as $A_i$-$D_i$, meet the respective associated one of the plurality of sensor elements 12 of the PIR sensor 11, which are designated as A-D and are arranged adjacent to one another.

Further, it is indicated in FIG. 5 that the optical unit 15 of the motion sensor device 10 is configured to completely image all of the detection zones 17 of the detection region 16 of the PIR sensor 11 in the detection area 13 of the PIR sensor 11.

Figure 6:
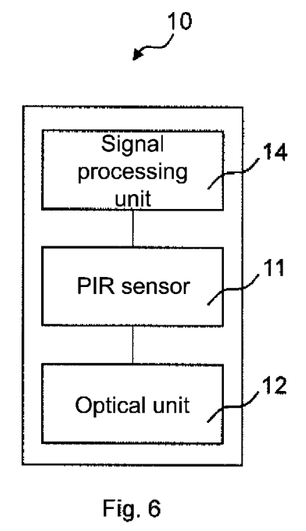
FIG. 6 schematically shows a block diagram of a motion sensor device in accordance with exemplary embodiments.

FIG. 6 schematically shows a block diagram of a motion sensor apparatus 10 in accordance with exemplary embodiments.

The motion sensor device 10 comprises: a PIR sensor 11 having a plurality of sensor elements 12 arranged adjacent to one another, the active sensor surfaces of which form a detection area 13 of the PIR sensor 11; and an optical unit 15 which is configured to image a detection region 16 of the motion sensor device 10, which comprises detection zones 17, on the detection area 13 of the PIR sensor 11. The detection zones 17 in the detection region 16 of the motion sensor device 10 thereby have a spatially periodic arrangement with direction-dependent periodicity.

In addition, FIG. 6 shows that the motion sensor device 10 further comprises a signal processing unit 14 which is configured to determine the direction-dependent periodicity of the detection zones 17 in the detection region 16 of the motion sensor device 10.

In particular, the signal processing unit 14 is configured to form differential signals from output signals of the sensor elements 12 between pairs of sensor elements 12 of the PIR sensor 11 arranged adjacent to one another, and/or to determine frequency components in the differential signals or output signals. For example, this can take place by means of frequency analysis (spectral analysis).

Figure 7:
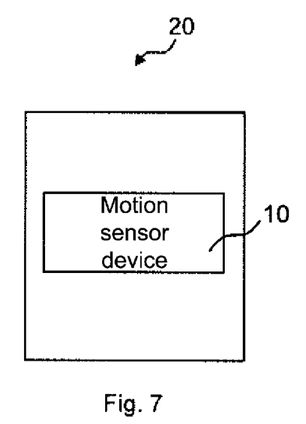
FIG. 7 schematically shows a block diagram of a lighting system in accordance with an exemplary embodiment.

FIG. 7 schematically shows a block diagram of a lighting system 20 in accordance with one exemplary embodiment.

The lighting system 20 comprises a motion sensor device 10 in accordance with exemplary embodiments, for which reason it benefits from their effects and advantages.

In particular, this enables lighting applications based on a detection of movements, directions of movement, and/or stop locations of objects which move in the detection region of the motion sensor device 10.

Figure 8:
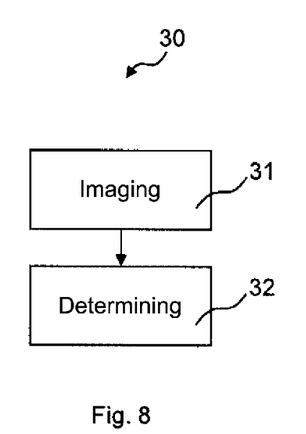
FIG. 8 shows method steps of a method for operating a motion sensor device in accordance with exemplary embodiments.

FIG. 8 shows method steps 31, 32 of a method 30 for operating a motion sensor device 10 in accordance with exemplary embodiments.

The motion sensor device 10 thereby comprises a PIR sensor 11 with a plurality of sensor elements 12 arranged adjacent to one another, whose active sensor surfaces form a detection area 13 of the PIR sensor 11.

In the first step 31, a detection region 16 of the PIR sensor 11, which detection region 16 comprises detection zones 17, is imaged on the detection area 13 of the PIR sensor 11. The detection zones 17 in the detection region 16 of the motion sensor device 10 thereby have a spatially periodic arrangement with direction-dependent periodicity, as exemplified in FIG. 4-5.

In the second step 32, the direction-dependent periodicity of the detection zones 17 in the detection region 16 of the motion sensor device 10 is determined. In particular, as previously explained in connection with FIG. 6, this is done by spectral analysis of those signals which are supplied by conventional PIR sensors 11.

The method 30 is performed in particular with the motion sensor apparatus 10 in accordance with exemplary embodiments.

Although motion sensor devices, methods for operating the same, and lighting systems having these motion sensor devices in accordance with exemplary embodiments have been described, various modifications may be realized in additional exemplary embodiments. For example, detection zones 17 which are to be imaged on sensor elements 12 of the PIR sensor 11 which are connected in opposite polarity to one another could be arranged in the detection region 16 of the motion sensor device 10 in such a way that they receive radiation along preferred movement paths, optimally not simultaneously but in alternation. For example, this could take place via an alternating arrangement of detection zones 17 which are to be imaged on sensor elements 12 of the PIR sensor 11 which are connected in opposite polarity to one another along preferred movement paths. Differentiation within detection regions 16 could furthermore be made with respect to granularity of detection zones 17. Detection zones 17 having smaller spatial dimensions, which enable a particularly precise detection of movement, direction of movement, and/or stop location, could thus preferably be arranged in one part of the detection region 16, whereas other parts of the detection region 16 preferably comprise detection zones 17 having larger spatial dimensions, since there an imprecise recognition is sufficient.

What is claimed is:

1. A motion sensor device (10) comprising:
   a PR sensor (11) having a plurality of sensor elements (12) arranged adjacent to one another, whose active sensor surfaces form a detection area (13) of the PIR sensor (11); a
   an optical unit (15) configured to image a detection region (16) comprising groups of detection zones (17) onto the detection area (13) of the PR sensor (11), wherein the number and arrangement of the detection zones (17) of any one of the groups corresponds to the number and arrangement of the sensor elements (12) in the detection area (13) of the PIR sensor (11), and the optical unit (15) is configured to scale the magnitude of the image in a first dimension which is aligned in a first direction (18) in the detection region (16) of the PR sensor (11) for at least one group of the detection zones (17) and is further configured to superimpose the groups of the detection zones (17) in the detection area (13) of the PIR sensor (11), wherein the detection zones (17) in the detection region (16) of the PR sensor (11) have a spatially periodic arrangement with direction-dependent periodicity; and
   a signal processing unit (14) configured to receive output signals from the PIR sensor (11).

2. The motion sensor device (10) according to claim 1, wherein
   the signal processing unit (14) is further configured to form differential signals from output signals of the sensor elements (12) between pairs of sensor elements (12) of the PIR sensor (11) which are arranged adjacent to one another; and/or determine frequency components in the differential signals or the output signals.

3. The motion sensor device (10) according to claim 1, wherein
   the optical unit (15) is further configured to scale the magnitude of the image for at least one group of the detection zones (17) in a second dimension which is aligned in a second direction (19) in the detection region (16) of the PR sensor (11), and the detection zones (17) have a spatially periodic arrangement with direction-dependent periodicity in accordance with the first and second directions (18, 19) which are orthogonal to one another in the detection region (16) of the motion sensor device (10).

4. The motion sensor device (10) according to claim 3, wherein the optical unit (15) is configured to image groups of the detection zones (17) via a respective imaging in the detection area (13) of the PIR sensor (11), and the optical unit is further configured to compress the imaged detection zones (17) in the first direction for a first group of the detection zones (17), to expand the imaged detection zones (17) in the second direction for a second group of the detection zones (17), and to not scale the imaged detection zones (17) for a third group of the detection zones (17).

5. The motion sensor device (10) according to claim 1, wherein
the optical unit (15) is configured to image all of the detection zones (17) of the detection region (16) of the PIR sensor (11) completely in the detection area (13) of the PIR sensor (11).

6. The motion sensor device (10) according to claim 1, wherein
the PIR sensor (11) comprises two or four of the sensor elements (12) arranged adjacent to one another.

7. A lighting system (20) comprising: the motion sensor device (10) according to claim 1.

8. A method (30) for operating a motion sensor device (10), wherein
the motion sensor device (10) comprises a PR sensor (11) having a plurality of sensor elements (12) arranged adjacent to one another whose active sensor surfaces form a detection area (13) of the PR sensor (11) and an optical unit (15) configured to image a detection region (16) of the PR sensor (11), which detection region (16) comprises groups of detection zones (17) imaged on the detection area (13) of the PR sensor (11), said optical unit (15) being further configured to scale at least one group of the detection zones (17) in a first dimension which is aligned in a first direction and configured to scale at least one group of the detection zones (17) in a second dimension which is aligned in a second direction (19) in the detection region (16) of the PIR sensor (11), wherein the detection zones (17) have a spatially periodic arrangement with direction-dependent periodicity in accordance with the first and second directions (18, 19) which are orthogonal to one another in the detection region (16) of the motion sensor device (10) and the optical unit is further configured to superimpose the groups of the detection zones (17) in the detection area (13) of the PR sensor (11), wherein the method (30) comprises:

imaging (31) of a detection region (16) of the PR sensor (11), which detection region (16) comprises said groups of detection zones (17) onto the detection area (13) of the PIR sensor (11);

wherein the detection zones (17) in the detection region (16) of the PR sensor (11) have a spatially periodic arrangement with direction-dependent periodicity; and determining (32) the direction-dependent periodicity of the detection zones (17) in the detection region (16) of the PR sensor (11).

* * * * *

UNITED STATES PATENT AND TRADEMARK OFFICE
CERTIFICATE OF CORRECTION

PATENT NO. : 11,454,544 B2
APPLICATION NO. : 16/644620
DATED : September 27, 2022
INVENTOR(S) : Markus Kunzli et al.

It is certified that error appears in the above-identified patent and that said Letters Patent is hereby corrected as shown below:

In the Claims

Claim 1, Column 8, Line 17, delete "PR" and substitute therefor -- PIR --;

Claim 1, Column 8, Line 23, delete "PR" and substitute therefor -- PIR --;

Claim 1, Column 8, Line 31, delete "PR" and substitute therefor -- PIR --;

Claim 1, Column 8, Line 36, delete "PR" and substitute therefor -- PIR --;

Claim 3, Column 8, Line 55, delete "PR" and substitute therefor -- PIR --;

Claim 8, Column 9, Line 18, delete "PR" and substitute therefor -- PIR --;

Claim 8, Column 9, Line 21, delete "PR" and substitute therefor -- PIR --;

Claim 8, Column 9, Line 23, delete "PR" and substitute therefor -- PIR --;

Claim 8, Column 9, Line 25, delete "PR" and substitute therefor -- PIR --;

Claim 8, Column 10, Line 13, delete "PR" and substitute therefor -- PIR --;

Claim 8, Column 10, Line 15, delete "PR" and substitute therefor -- PIR --;

Claim 8, Column 10, Line 20, delete "PR" and substitute therefor -- PIR --;

Claim 8, Column 10, Line 24, delete "PR" and substitute therefor -- PIR --.

Signed and Sealed this
Fifteenth Day of November, 2022

Katherine Kelly Vidal
*Director of the United States Patent and Trademark Office*